United States Patent
Knight et al.

(10) Patent No.: US 9,988,552 B2
(45) Date of Patent: Jun. 5, 2018

(54) PHENOLIC MODIFIED POLYESTERS AND AQUEOUS DISPERSIONS

(75) Inventors: Michael C. Knight, Carpentersville, IL (US); David G. Grant, Carpentersville, IL (US)

(73) Assignee: Polynt Composites USA, Inc., Carpentersville, IL (US)

( * ) Notice: Subject to any disclaimer, the term of this patent is extended or adjusted under 35 U.S.C. 154(b) by 679 days.

(21) Appl. No.: 14/005,722

(22) PCT Filed: Mar. 16, 2012

(86) PCT No.: PCT/US2012/029520
§ 371 (c)(1),
(2), (4) Date: Sep. 17, 2013

(87) PCT Pub. No.: WO2012/125962
PCT Pub. Date: Sep. 20, 2012

(65) Prior Publication Data
US 2014/0010925 A1 Jan. 9, 2014

Related U.S. Application Data

(60) Provisional application No. 61/453,773, filed on Mar. 17, 2011, provisional application No. 61/561,147, filed on Nov. 17, 2011.

(51) Int. Cl.
| | | |
|---|---|---|
| C09D 167/00 | (2006.01) | |
| B32B 27/36 | (2006.01) | |
| B32B 15/09 | (2006.01) | |
| C09D 5/10 | (2006.01) | |
| B32B 15/082 | (2006.01) | |
| C09D 175/04 | (2006.01) | |
| C08G 18/40 | (2006.01) | |
| C09D 133/14 | (2006.01) | |
| C09D 163/00 | (2006.01) | |
| C09D 151/08 | (2006.01) | |
| C08G 18/54 | (2006.01) | |
| C08G 63/91 | (2006.01) | |
| C08G 18/80 | (2006.01) | |
| C08K 5/3415 | (2006.01) | |
| C08G 81/02 | (2006.01) | |
| C09D 187/00 | (2006.01) | |

(52) U.S. Cl.
CPC .......... *C09D 167/00* (2013.01); *B32B 15/082* (2013.01); *B32B 15/09* (2013.01); *B32B 27/36* (2013.01); *C08G 18/4027* (2013.01); *C08G 18/542* (2013.01); *C08G 18/8074* (2013.01); *C08G 63/914* (2013.01); *C08G 63/916* (2013.01); *C08G 63/918* (2013.01); *C08G 81/027* (2013.01); *C08K 5/3415* (2013.01); *C09D 5/106* (2013.01); *C09D 133/14* (2013.01); *C09D 151/08* (2013.01); *C09D 163/00* (2013.01); *C09D 175/04* (2013.01); *C09D 187/005* (2013.01); *C08G 2390/40* (2013.01); *Y10T 428/1355* (2015.01)

(58) Field of Classification Search
CPC ................ C08G 63/914; C08G 81/027; C08G 18/4027; C08G 18/542; C08G 18/8074; C08G 2390/40; C08G 63/916; C08G 63/918; C08K 5/3415; C09D 167/00; C09D 187/005; C09D 5/106; C09D 175/04; C09D 133/14; C09D 151/08; C09D 163/00; B32B 15/09; B32B 15/082; B32B 27/36
See application file for complete search history.

(56) References Cited

U.S. PATENT DOCUMENTS

| | | |
|---|---|---|
| 2,825,712 A | 3/1958 | Witzel |
| 3,647,757 A | 3/1972 | Lee |
| 6,893,678 B2 | 5/2005 | Hirose et al. |
| 2003/0113462 A1* | 6/2003 | Hirose .................. C08F 283/01 427/388.4 |
| 2010/0243506 A1 | 9/2010 | Cleaver et al. |

FOREIGN PATENT DOCUMENTS

WO 2010068673 A1 6/2010

OTHER PUBLICATIONS

International Search Report PCT/US2012/029520 dated Jun. 22, 2012.
Extended European search report for Application No. 12757058.8 dated Jun. 26, 2014.

* cited by examiner

*Primary Examiner* — Walter B Aughenbaugh
(74) *Attorney, Agent, or Firm* — Neal, Gerber & Eisenberg LLP

(57) ABSTRACT

Substrates, such as the interior surfaces of food containers, can be coated using a composition including a phenolic modified polyester resin prepared using a formulation not including Bisphenol A as a component or subcomponent. These polymers arid subsequent coatings are free of both mobile and bound Bisphenol A moieties. These polymers and resulting coatings have properties similar to and, in some embodiments, superior over comparable conventional polyester coatings.

18 Claims, No Drawings

PHENOLIC MODIFIED POLYESTERS AND AQUEOUS DISPERSIONS

BACKGROUND OF THE INVENTION

Field of the Disclosure

The invention relates to a phenolic modified polyesters for use in can coatings. The invention particularly relates to a coating systems that come in contact with food and beverages.

Background of the Disclosure

In the food and beverage industry of both today and the past, the preservation of food has been an issue that has tested the limits of the technology of the times. For example, margarine was the product of a Chemist seeking to win a prize for making a butter substitute for use by the French armed forces in the middle of the $19^{th}$ century. Early efforts of preserving foods were sometimes tragic. The Franklin Expedition, a 19th century effort to find a Northwest passage, was doomed, at least in part, by its provisions. This early effort of "canning" used lead to seal the seams of the cans which contaminated the food therein.

Fortunately modern efforts of canning are safe and becoming safer. Metal containers for receiving foods and beverages generally have one or more coatings to prevent contact between the filled product and metal. This is to prevent or minimize corrosion to the metal by the product and any disadvantageous influences on the quality of the product. For producing containers of this type, such as cans of tin-plated or chromium-plated steels or aluminium, metal sheets are used which, prior to their shaping (such as for three-piece can production) or deformation (such as for deep drawing process), are coated with suitable coating compositions.

In producing cans for foods and beverages, coatings are required which are extremely flexible and have a low order of toxicity. Furthermore, filled food cans are often sterilized. Sterilization processes may expose food containers, such as cans, to temperatures of 135° C. or greater. It follows then, that coatings used to preserve food must therefore be sufficiently stable at those temperatures and must be capable of adhering to the surface of the metal.

Recently, the use of coatings formulated with Bisphenol A have come under scrutiny. It would be desirable in the art of coating food containers to use a coating produced using little or no Bisphenol A.

SUMMARY OF THE DISCLOSURE

In one aspect, the invention is a composition of a solvent borne phenolic modified polyester resin prepared using a formulation not including Bisphenol A as a component or subcomponent.

In another aspect, the invention is an aqueous dispersion of a phenolic modified polyester resin prepared using a formulation not including Bisphenol A as a component or subcomponent.

DETAILED DESCRIPTION OF THE DISCLOSURE

One embodiment of the present invention is directed to a composition comprising a phenolic modified polyester resin. The term "polyester," as used herein, is intended to include homopolyesters, copolyesters, and terpolyesters. In general, polyesters are synthetic polymers prepared by the condensation of one or more carboxylic acids, preferably difunctional carboxylic acids, with one or more polyalcohols, preferably di- or tri-alcohols. The term "residue", as used herein, means any organic structure incorporated into a polymer through a polycondensation and/or an esterification reaction from the corresponding monomer. The term "repeating unit", when used in connection with a polyester, means an organic structure having a dicarboxylic acid residue and a diol residue bonded through an ester linkage.

The phenolic modified polyester resins are generally prepared using a formulation that includes one or more dicarboxylic acids, one or more polyalcohols, preferably a di or tri-alcohol, and one or more phenolic resins.

The dicarboxylic acids useable in connection with the phenolic modified polyester resins of the invention generally include any that are known to be useable to those of ordinary skill in the art of preparing polyesters, especially polyester coatings useful for coatings in contact with food and beverages. Such dicarboxylic acids include, but are not limited to: succinic acid, glutaric acid, dimethyl glutaric, acid, adipic acid, dimethyl adipic acid, azelaic acid, phthalic acid, isophthalic acid, 5-tert-butyl isophthalic acid, terephthalic acid, dimethyl terephthalic acid, 2,6-naphthalene dicarboxylic acid, and mixtures thereof.

The polyalcohols useable in connection with the present invention as formulation components for preparing the phenolic modified polyester resins may be any known to those of ordinary skill in the art. Exemplary compounds include, but are not limited to: ethylene glycol, propylene glycol, 1,3-propanediol, 2-methyl-1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, trimethylol propane, hexylene glycol, cyclohexanedimethanol, a polyethylene or polypropylene glycol having an Mw of about 500 or less, and mixtures thereof. Bisphenol A (isopropylidenediphenol) is not used with the formulations of the disclosure.

In one embodiment, the phenolic modified polyester resins of the disclosure are prepared by first condensing a diol and a dicarboxylic acid using a catalyst to form a polyester resin. After the condensation is complete, the resulting polyester resin is grafted with a phenolic resin. In an alternative embodiment, the polyester resin may be prepared in two steps prior to grafting by doing a polycondensation of a first diol and dicarboxylic acid and then a second polycondensation of the first resin with an additional diol and dicarboxylic acid. In still another embodiment, a mixture of at least two diols and/or dicarboxylic acids are subjected to condensation conditions to prepare the polyester resin. The molar ratio of OH to COOH is preferably from 1.1/1.0 to 1.01/1.0

The selected polyester preferably has a molecular weight Mw of between 6,000 and 100,000 g/mol, preferably 7,000 to 50,000 g/mol and more preferably 7,000 to 35,000 g/mol. The Acid Number of between 25 and 55, preferably between 30 and 45 and more preferably between 35 and 45. The polyester preferably has an hydroxyl number between 30 and 60 and a Tg of between 30° C. and 55° C.

The phenolic resins which may used to prepare the phenolic modified polyester resins are any that may be grafted onto a polyester resin and are not prepared using Bisphenol A. For example, one such resin is a novolak resin and another is a resole resin. Generally speaking, the novolak resins suitable for use in the formulations of the disclosure are generally the condensation product, preferably the polycondensation products, of at least one aromatic hydrocarbon, preferably including a moiety with a hydroxyl group bound to an aromatic ring, with at least one of an aldehyde or ketone. The phenolic moiety cannot include bisphenol A or a Bisphenol A moiety. The novolak resins are generally prepared using an excess of aromatic hydrocarbon, i.e. the aldehyde/phenol ratio is less than one. The aromatic hydrocarbon may be selected from, but is not limited to, m-cresol, o-cresol, p-cresol, 2,5-xylenol, 3,5-xylenol, resorcinol, pyrogallol, phenol, trisphenol, o-ethyl phenol, methyl phenol, p-ethyl phenol, propyl phenol, n-butyl phenol, t-butyl phenol, 1-naphthol, and 2-naphthol. The at least one aldehyde or ketone may be selected from, but is not limited to, formaldehyde, acetaldehyde, propion aldehyde, benzaldehyde, furfural, acetone, methyl ethyl ketone, and methyl isobutyl ketone, in the presence of an acid.

When a resole resin is used with the formulations of the disclosure, it may be an organic hydrocarbon and an aldehyde and/or ketone polycondensation product where the two components are present in nearly equal molar ratio to an excess of the aldehyde and/or ketone. The components useful for making the resole are the same as those designated as useful for preparing the novolak.

In another embodiment of the method of the disclosure, the phenolic resin may be prepared using an alcohol. Suitable alcohols include, but are not limited to ethanol, propanol, butanol, pentanol, and the like. Such resins are sometimes referred to in the art as etherified resins.

The phenolic modified polyester resins of the disclosure may be prepared in manner or using any method known to be useful for preparing such resins to those of ordinary skill in the art. Generally, the phenolic resin is grafted to the polyester resin. For example, in one embodiment, a polyester resin is prepared and then a phenolic resin is grafted upon it. In another embodiment, a premade polyester resin is obtained and then used for grafting with the phenolic resin. Any method that results in a composition having a phenolic resin suitably grafted to the polyester resin may be used with the method of the disclosure. Preferably, the phenolic resin mixed with the polyester in amount that is 6% to 30% per total weight of the combined resins, and the polyester resin is 70% to 94% per total weight.

The phenolic modified polymer preferably has a molecular weight Mw of between 6,000 and 100,000 g/mol, preferably 7,000 to 50,000 g/mol and more preferably 7,000 to 35,000 g/mol. The phenolic modified polyester preferably has a Tg of between 20° C. and 35° C.

Where useful catalysts may be used with method of the disclosure. Catalysts useful with the method of the disclosure include strong acids, strong bases, and organo-tin catalysts. Any catalyst that can be used to catalyze an ester condensation may be used. In some embodiments, the catalysts will be selected to facilitate the use of the resulting resin in an application where a film prepared with the resin is in contact with food and/or beverage.

At each step of the process of the disclosure, a solvent may be used to control the viscosity of the reactants, primarily to prevent the reaction mixture from becoming too viscous for safe handling. Any solvent that will reduce viscosity but not interfere with the condensation and/or grafting may be used. In one embodiment, the solvent may be but is not limited to methyl N-amyl ketone, N-methyl pyrrolidone (NMP), ethanol, methanol, propanol, acetone, methyl ethyl ketone, benzene, ethylene glycol monobutyl ether (EB), toluene, xylene, naphthalene, nonene and petroleum fractions.

Another embodiment of the present invention is directed to a composition comprising a phenolic modified polyester resin dispersed in water or solvent. Any method known to those of ordinary skill in the art of preparing a dispersion from organic resins may be used. For example, the method of U.S. Pat. No. 6,277,953 to Nothnagel, et al., which is fully incorporated by reference in its entirety, where the resin is solvated in an organic hydrophilic solvent and then removing the hydrophilic organic solvent from a solvent blend of water and the hydrophilic organic solvent at temperatures which minimize the mean particle size of the polymer in the resulting aqueous dispersion of the polymer and/or removing the organic solvent from the polymer/organic solvent/water blend such that inversions do not occur.

The phenolic modified polyester resins, and the resulting dispersions are substantially free of Bisphenol A and Bisphenol A moieties. The resins and dispersions are generally made substantially free of bisphenol A and Bisphenol A moieties by the use of materials and reactants that do not contain Bisphenol A or Bisphenol A moieties as a component or subcomponent.

To test the efficiency of the phenolic modified polyester a substrate must be coated with a film prepared using a formulation not including Bisphenol A as a component or subcomponent. For the purposes of this application, the term "not including Bisphenol A as a component or subcomponent" means that the subject film is prepared with no component of the formulation being Bisphenol A and that nothing used to prepare the components of the film formulation is prepared using Bisphenol A. The resulting film is substantially free of both mobile and bound Bisphenol A and/or Bisphenol A moieties.

The compositions of the disclosure can be used to prepare coatings that are heat resistant, and resistant to erosion in the presence of salty or alcoholic beverages. They have about the same properties as similar resins prepared using Bisphenol A, but are free of both mobile and bound Bisphenol A and Bisphenol A moieties.

While ideal for use in coating substrates in contact with food and/or beverages, such as the interior of beverage cans, the compositions of the disclosure may be used for any application where such a coating would be desirable. For example, the compositions of the disclosure may be used as anticorrosion coatings, electrically insulating varnishes, and even powder coatings.

The coatings may be applied to the substrate using any method known to be useful to those of ordinary skill in the art. Generally speaking, these application techniques include spray coating, dip coating sheet coating and curtain coating. Appropriate curing may be required in some or all of these methods.

The compositions of the disclosure may optionally include other additives that do not adversely affect the coating composition or a cured coating resulting therefrom. The optional additives, like the other components of the coating, are at least substantially free of mobile and/or bound Bisphenol A moieties. In one embodiment, the additive are completely free of such compounds. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are carriers, additional polymers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents or combinations thereof. Each optional ingredient can be included in a sufficient amount to serve its intended purpose, but preferably not in such an amount to adversely affect a coating composition or a cured coating resulting therefrom.

EXAMPLES AND COMPARATIVE EXAMPLES

The following examples and comparative examples are provided to illustrate certain embodiments of the invention. The examples are not intended to limit the scope of the application and they should not be so interpreted. Amounts are in w/v parts or w/v percentages unless otherwise indicated.

Example 1

A. Synthesis of Phenolic Modified Polyester Resin
 1. 876.4 grams of 2-methyl, 1,3-propanediol (MP Diol), 371.6 grams of 1,4-cyclohexanedimethanol (CHDM-90), 101.5 grams of trimethylol propane (TMP) and 0.68 grams Fascat 9100 catalyst were charged to a round bottom flask equipped with a packed column, partial condenser, receiver, and under a nitrogen blanket.
 2. The flask was heated until the glycols were melted and 374.2 grams of adipic acid (AA) and 1496.6 grams of isophthalic acid (IPtA) were added with mixing.
 3. The temperature was steadily and gradually increased to 227 degrees centigrade and waters of esterification were removed.
 4. When the acid value was 9.1, the temperature was reduced to 150 degrees centigrade.
 5. The packed column was replaced with a decanter and 313.8 grams of Bakelite PF6535 etherified phenolic resol was added to the flask. The temperature is increased gradually to 188 degrees centigrade and held at this temperature for 45 minutes. 109.9 grams of n-butanol/1-methoxy-2-propanol from PF 6535 is collected and removed.
 6. The temperature was reduced to 170 degrees centigrade and 216.9 grams of trimellitic anhydride (TMA) and 260 grams of N-methyl pyrrolidone (NMP) were added. The temperature is maintained at 170 degrees centigrade until an acid value of 47.5 was reached.
 7. The temperature was reduced to 70 degrees centigrade and the polymer was cut to 80% NV with methyl ethyl ketone (MEK) and then to 70% NV with ethylene glycol monobutyl ether (EB).

The physical properties of the Solution from Step 7:

| Percent Solids | NVM | 70 |
| Acid Value | Mg KOH/g | 46.6 |
| Molecular Weight | Mn | 2568 |
| Molecular Weight | Mw | 106,000 |
| Hydroxyl Number | Mg KOH/g | 56 |

B. Preparation of Phenolic Modified Polyester Dispersion (PMPD)
 1. 1006 grams of the phenolic modified polyester solution at 70% NVM and 52.1 grams of Dimethylethanol amine (DMEOA) were charged to a round bottom flask equipped with a total condenser and receiver.
 2. The flask was heated to 40 degrees centigrade with mixing.
 3. Upon reaching temperature, 1213.8 grams of deionized water was added over approximately 30 minutes.
 4. Vacuum was applied to the flask and slowly increased to a maximum of 26 inches of mercury.
 5. Vacuum was continued until 42% NVM is reached and then deionized water is added for a final NVM of 40%.

The physical properties of the dispersion are:

| Percent Solids | NVM | 40 |
| pH | — | 7.5 |
| Particle Size | nm | 20.9 |

Example 2

A. Synthesis of Phenolic Modified Polyester Resin
 1. 902.2 grams of 2-methyl, 1,3-propanediol (MP Diol), 382.5 grams of 1,4-cyclohexanedimethanol (CHDM-90), 104.5 grams of trimethylol propane (TMP) and 0.70 grams Fascat 9100 catalyst were charged to a round bottom flask equipped with a packed column, partial condenser, receiver, and nitrogen blanket.
 2. The flask was heated until the glycols were melted and 481.5 grams of adipic acid (AA) and 1444.7 grams of isophthalic acid (IPtA) were added with mixing.
 3. The temperature was steadily and gradually increased to 227 degrees centigrade and waters of esterification were removed.
 4. When the acid value was 9.4, the temperature was reduced to 170 degrees centigrade.
 5. 223.3 grams of trimellitic anhydride (TMA) and 254 grams of N-methyl pyrrolidone (NMP) were added. The temperature was maintained at 170 degrees centigrade until an acid value of 50 was reached.
 6. The packed column was replaced with a decanter and 323.1 grams of Bakelite PF6535 etherified phenolic resol was added to the flask. The temperature was increased gradually to 188 degrees centigrade and held at this temperature for 45 minutes. 113.1 grams of n-butanol/1-methoxy-2-propanol from PF 6535 is collected and removed.
 7. The temperature was reduced to 70 degrees centigrade and the polymer was cut to 80% NV with methyl ethyl ketone (MEK) and then to 70% NV with ethylene glycol monobutyl ether (EB).

The physical properties of the Solution from Step 7:

| Percent Solids | NVM | 70 |
| Acid Value | Mg KOH/g | 45 |
| Molecular Weight | Mn | 2729 |
| Molecular Weight | Mw | 31,000 |
| Hydroxyl Number | Mg KOH/g | 58 |

B. Preparation of Phenolic Modified Polyester Dispersion (PMPD)
 1. 1308.5 grams of the phenolic modified polyester solution at 70% NVM and 65.4 grams of Dimethylethanolamine (DMEOA) were charged to a round bottom flask equipped with a total condenser and receiver.
 2. The flask was heated to 40 degrees centigrade with mixing.
 3. Upon reaching temperature, 1580.8 grams of deionized water was added over approximately 30 minutes.
 4. Vacuum was applied to the flask and slowly increased to a maximum of 26 inches of mercury.
 5. Vacuum was continued until 42% NVM is reached and then deionized water is added for a final NVM of 40%.

The physical properties of the dispersion are:

| Percent Solids | NVM | 40 |
|---|---|---|
| pH | — | 7.2 |
| Particle Size | nm | 20.8 |

Example 3

A. Synthesis of Phenolic Modified Polyester Resin 1. 1106.9 grams of 2-methyl, 1,3-propanediol (MP Diol), 48.0 grams of trimethylol propane (TMP) and 3.2 grams Fascat 9100 catalyst were charged to a round bottom flask equipped with a packed column, partial condenser, receiver, and nitrogen blanket.

2. The flask was heated until the glycols were melted and 1726.1 grams of terephthalic acid (TPA) and 191.8 grams of isophthalic acid (IPtA) were added with mixing.

3. The temperature was steadily and gradually increased to 238 degrees centigrade and waters of esterification were removed.

4. When the acid value was 10.8, the temperature was reduced to 182 degrees centigrade and 127.2 grams of trimellitic anhydride (TMA) and 229 grams of N-methyl pyrrolidone (NMP) were added. The temperature is maintained at 182 degrees centigrade until an acid value of 39.4 was reached.

5. The packed column was replaced with a decanter and 304.0 grams of Bakelite PF6535 etherified phenolic resol was added to the flask. The temperature is increased gradually to 182 degrees centigrade and held at this temperature for 35 minutes. 75 grams of n-butanol/1-methoxy-2-propanol from PF 6535 is collected and removed.

6. The temperature was reduced to 70 degrees centigrade and the polymer was cut to 70% NV with methyl ethyl ketone (MEK).

The physical properties of the Solution from Step 6:

| Percent Solids | NVM | 68.6 |
|---|---|---|
| Acid Value | Mg KOH/g | 25.5 |
| Molecular Weight | Mn | 1757 |
| Molecular Weight | Mw | 46,200 |
| Hydroxyl Number | Mg KOH/g | 51.5 |
| Tg | ° C. | 34.9 |

B. Preparation of Phenolic Modified Polyester Dispersion (PMPD)

1. 1150.9 grams of the phenolic modified polyester solution at 68.6% NVM and 32.0 grams of Dimethylethanolamine (DMEOA) were charged to a round bottom flask equipped with a total condenser and receiver.

2. The flask was heated to 30 degrees centigrade with mixing.

3. Upon reaching temperature, 1387.8 grams of deionized water was added over approximately 30 minutes.

4. Vacuum was applied to the flask and slowly increased to a maximum of 26 inches of mercury.

5. Vacuum was continued until 44% NVM is reached and then deionized water is added for a final NVM of 40%.

The physical properties of the dispersion are:

| Percent Solids | NVM | 40 |
|---|---|---|
| pH | — | 7.7 |
| Particle Size | nm | 109.1 |

Example 4

A. Synthesis of Phenolic Modified Polyester Resin 1. 1113.7 grams of 2-methyl, 1,3-propanediol (MP Diol), 48.0 grams of trimethylol propane (TMP) and 3.2 grams Fascat 9100 catalyst were charged to a round bottom flask equipped with a packed column, partial condenser, receiver, and nitrogen blanket.

2. The flask was heated until the glycols were melted and 129.3 grams of adipic acid (AA), 177.2 grams of isophthalic acid (IPtA) and 1594.7 grams of terephthalic acid (TPA) were added with mixing.

3. The temperature was steadily and gradually increased to 238 degrees centigrade and waters of esterification were removed.

4. When the acid value was 9.3, the temperature was reduced to 182 degrees centigrade and 137.3 grams of trimellitic anhydride (TMA) and 227 grams of N-methyl pyrrolidone (NMP) were added. The temperature is maintained at 182 degrees centigrade until an acid value of 36.7 was reached.

5. The packed column was replaced with a decanter and 305 grams of Bakelite PF6535 etherified phenolic resol was added to the flask. The temperature is increased gradually to 182 degrees centigrade and held at this temperature for 35 minutes. 82 grams of n-butano/1-methoxy-2-propanol 1 from PF6535 is collected and removed.

6. The temperature was reduced to 70 degrees centigrade and the polymer was cut to 70% NV with methyl ethyl ketone (MEK).

The physical properties of the Solution from Step 6:

| Percent Solids | NVM | 68.5 |
|---|---|---|
| Acid Value | Mg KOH/g | 24.6 |
| Molecular Weight | Mn | 1727 |
| Molecular Weight | Mw | 42,533 |
| Hydroxyl Number | Mg KOH/g | 52.8 |
| Tg | ° C. | 26.2 |

B. Preparation of Phenolic Modified Polyester Dispersion (PMPD)

1. 1126.6 grams of the phenolic modified polyester solution at 68.5% NVM, and 30.2 grams of Dimethylethanolamine (DMEOA) were charged to a round bottom flask equipped with a total condenser and receiver.

2. The flask was heated to 30 degrees centigrade with mixing.

3. Upon reaching temperature, 1380.9 grams of deionized water was added over approximately 30 minutes.

4. Vacuum was applied to the flask and slowly increased to a maximum of 26 inches of mercury.

5. Vacuum was continued until 45% NVM is reached and then deionized water is added for a final NVM of 40%.

The physical properties of the dispersion are:

| Percent Solids | NVM | 40 |
|---|---|---|
| pH | — | 7.3 |
| Particle Size | nm | 114.8 |

Example 5

A. Synthesis of Phenolic Modified Polyester Resin 1. 1113.7 grams of 2-methyl, 1,3-propanediol (MP Diol), 48.0 grams of trimethylol propane (TMP) and 3.2 grams Fascat 9100 catalyst were charged to a round bottom flask equipped with a packed column, partial condenser, receiver, and nitrogen blanket.

2. The flask was heated until the glycols were melted and 129.3 grams of adipic acid (AA), 177.2 grams of isophthalic acid (IPtA) and 1594.7 grams of terephthalic acid (TPA) were added with mixing.

3. The temperature was steadily and gradually increased to 238 degrees centigrade and waters of esterification were removed.

4. When the acid value was 9.4, the temperature was reduced to 182 degrees centigrade.

5. 137.3 grams of trimellitic anhydride (TMA) and 227 grams of N-methyl pyrrolidone (NMP) were added. The temperature was maintained at 182 degrees centigrade until an acid value of 38.2 was reached.

6. The packed column was replaced with a decanter and 590.8 grams of Bakelite PF6535 etherified phenolic resol was added to the flask. The temperature was increased gradually to 150 degrees centigrade and held at this temperature for 60 minutes. 72 grams of n-butanol/1-methoxy-2-propanol from PF 6535 is collected and removed.

7. The temperature was reduced to 70 degrees centigrade and the polymer was cut to 75% NV with methyl ethyl ketone (MEK) and then to 70% NV with ethylene glycol monobutyl ether (EB).

The physical properties of the Solution from Step 7:

| Percent Solids | NVM | 70.6 |
| Acid Value | Mg KOH/g | 23.6 |
| Molecular Weight | Mn | 2987 |
| Molecular Weight | Mw | 13,480 |

B. Preparation of Phenolic Modified Polyester Dispersion (PMPD)

1. 1126.1 grams of the phenolic modified polyester solution at 70.6% NVM and 29.8 grams of Dimethylethanolamine (DMEOA) were charged to a round bottom flask equipped with a total condenser and receiver.

2. The flask was heated to 30 degrees centigrade with mixing.

3. Upon reaching temperature, 1313.7 grams of deionized water was added over approximately 30 minutes.

4. Vacuum was applied to the flask and slowly increased to a maximum of 26 inches of mercury.

5. Vacuum was continued until 48% NVM is reached and then deionized water is added for a final NVM of 45%.

The physical properties of the dispersion are:

| Percent Solids | NVM | 45 |
| pH | — | 7.4 |
| Particle Size | nm | 28.8 |

Example 6A

A. Synthesis of Phenolic Modified Polyester Resin 1. 870.1 grams of 2-methyl, 1,3-propanediol (MP Diol), 37.5 grams of trimethylol propane (TMP) and 2.5 grams Fascat 9100 catalyst were charged to a round bottom flask equipped with a packed column, partial condenser, receiver, and nitrogen blanket.

2. The flask was heated until the glycols were melted and 101.0 grams of adipic acid (AA), 138.4 grams of isophthalic acid (IPtA) and 1245.8 grams of terephthalic acid (TPA) were added with mixing.

3. The temperature was steadily and gradually increased to 238 degrees centigrade and waters of esterification were removed.

4. When the acid value was 7.6, the temperature was reduced to 182 degrees centigrade.

5. 107.2 grams of trimellitic anhydride (TMA) and 177 grams of N-methyl pyrrolidone (NMP) were added. The temperature was maintained at 182 degrees centigrade until an acid value of 31.3 was reached.

6. The packed column was replaced with a decanter and 961.6 grams of Bakelite PF6535 etherified phenolic resol was added to the flask. The temperature was increased gradually to 150 degrees centigrade and held at this temperature for 60 minutes. 211 grams of n-butanol/1-methoxy-2-propanol from PF 6535 is collected and removed.

7. The temperature was reduced to 70 degrees centigrade and the polymer was cut to 75% NV with methyl ethyl ketone (MEK) and then to 70% NV with ethylene glycol monobutyl ether (EB).

The physical properties of the Solution from Step 7:

| Percent Solids | NVM | 72.0 |
| Acid Value | Mg KOH/g | 15.1 |
| Molecular Weight | Mn | 2973 |
| Molecular Weight | Mw | 29,072 |

B. Preparation of Phenolic Modified Polyester Dispersion (PMPD)

1. 1177.9 grams of the phenolic modified polyester solution at 72% NVM and 20.1 grams of Dimethylethanolamine (DMEOA) were charged to a round bottom flask equipped with a total condenser and receiver.

2. The flask was heated to 30 degrees centigrade with mixing.

3. Upon reaching temperature, 1454.3 grams of deionized water was added over approximately 30 minutes.

4. Vacuum was applied to the flask and slowly increased to a maximum of 26 inches of mercury.

5. Vacuum was continued until 48% NVM is reached and then deionized water is added for a final NVM of 45%.

The physical properties of the dispersion are:

| Percent Solids | NVM | 45 |
| pH | — | 6.88 |
| Particle Size | nm | 56.2 |

Example 6B

A. Synthesis of Phenolic Modified Polyester Resin 1. 870.1 grams of 2-methyl, 1,3-propanediol (MP Diol), 37.5 grams of trimethylol propane (TMP) and 2.5 grams Fascat 9100 catalyst were charged to a round bottom flask equipped with a packed column, partial condenser, receiver, and nitrogen blanket.

2. The flask was heated until the glycols were melted and 101.0 grams of adipic acid (AA), 138.4 grams of isophthalic acid (IPtA) and 1245.8 grams of terephthalic acid (TPA) were added with mixing.

3. The temperature was steadily and gradually increased to 238 degrees centigrade and waters of esterification were removed.

4. When the acid value was 6.1, the temperature was reduced to 182 degrees centigrade.

5. 107.2 grams of trimellitic anhydride (TMA) and 177 grams of methyl amyl ketone (MAK) were added. The temperature was maintained at 182 degrees centigrade until an acid value of 35.4 was reached.

6. The packed column was replaced with a decanter and 961.6 grams of Bakelite PF6535 etherified phenolic resol was added to the flask. The temperature was increased gradually to 150 degrees centigrade and held at this temperature for 60 minutes. 84 grams of n-butanol/1-methoxy-2-propanol from PF 6535 is collected and removed.

7. The temperature was reduced to 70 degrees centigrade and the polymer was cut to 75% NV with methyl ethyl ketone (MEK) and then to 70% NV with ethylene glycol monobutyl ether (EB).

The physical properties of the Solution from Step 7:

| Percent Solids | NVM | 70.6 |
| --- | --- | --- |
| Acid Value | Mg KOH/g | 19.4 |
| Molecular Weight | Mn | 2408 |
| Molecular Weight | Mw | 10,460 |

B. Preparation of Phenolic Modified Polyester Dispersion (PMPD)

1. 1203.6 grams of the phenolic modified polyester solution at 70.6% NVM and 26.1 grams of Dimethylethanolamine (DMEOA) were charged to a round bottom flask equipped with a total condenser and receiver.

2. The flask was heated to 30 degrees centigrade with mixing.

3. Upon reaching temperature, 1427.3 grams of deionized water was added over approximately 30 minutes.

4. Vacuum was applied to the flask and slowly increased to a maximum of 26 inches of mercury.

5. Vacuum was continued until 47% NVM is reached and then deionized water is added for a final NVM of 45%.

The physical properties of the dispersion are:

| Percent Solids | NVM | 45 |
| --- | --- | --- |
| pH | — | 7.4 |
| Particle Size | Nm | 36.3 |

Comparative Example 7

A. Synthesis of Polyester Resin 1. 1252.9 grams of 2-methyl, 1,3-propanediol (MP Diol), 54.0 grams of trimethylol propane (TMP) and 3.6 grams Fascat 9100 catalyst were charged to a round bottom flask equipped with a packed column, partial condenser, receiver, and nitrogen blanket.

2. The flask was heated until the glycols were melted and 145.4 grams of adipic acid (AA), 398.7 grams of isophthalic acid (IPtA) and 1594.7 grams of terephthalic acid (TPA) were added with mixing.

3. The temperature was steadily and gradually increased to 238 degrees centigrade and waters of esterification were removed.

4. When the acid value was 10.6, the temperature was reduced to 182 degrees centigrade.

5. 154.4 grams of trimellitic anhydride (TMA) and 250.4 grams of N-methyl pyrrolidone (NMP) were added. The temperature was maintained at 182 degrees centigrade until an acid value of 36 was reached.

6. The temperature was reduced to 70 degrees centigrade and the polymer was cut to 70% NV with methyl ethyl ketone (MEK).

The physical properties of the Solution from Step 6:

| Percent Solids | NVM | 73 |
| --- | --- | --- |
| Acid Value | Mg KOH/g | 35.55 |
| Molecular Weight | Mn | 2335 |
| Molecular Weight | Mw | 7,602 |
| Hydroxyl Number | Mg KOH/g | 44 |
| Tg | ° C. | 22.5 |

B. Preparation of Polyester Dispersion (PE)

1. 1087.8 grams of the polyester solution at 73% NVM and 44.9 grams of Dimethylethanolamine (DMEOA) were charged to a round bottom flask equipped with a total condenser and receiver.

2. The flask was heated to 30 degrees centigrade with mixing.

3. Upon reaching temperature, 1145.5 grams of deionized water was added over approximately 30 minutes.

4. Vacuum was applied to the flask and slowly increased to a maximum of 26 inches of mercury.

5. Vacuum was continued until 48% NVM is reached and then deionized water is added for a final NVM of 45%.

The physical properties of the dispersion are:

| Percent Solids | NVM | 45 |
| --- | --- | --- |
| pH | — | 8.2 |
| Particle Size | nm | 21.3 |

Examples 8-21

Comparative Examples are indicated by a C preceding their number. Clear coat films for draw down testing were prepared by applying the resins using the formulations shown below Alcoa chrome treated aluminium panels, electro-tinplate (ETP) and tin free steel (TFS) panels. Film weights were 3-4 mg/square inch (msi) for the aluminium panels and 1-2 msi for the TFS and ETP panels. The aluminium panels received a 60 second dwell time at 400 degrees Fahrenheit with a 45 second ramp up. The TFS and ETP panels received a 2 minute and 15 second at 400° F. bake. And then the ETP panels received an additional 5 minutes at 415° F. bake. The aluminium panels were then tested for retort resistance—90 minutes in lemon-lime Gatorade. The TFS panels were tested for flexibility. The ETP panels were tested for retort resistance for 90 minutes in deionized water and in 400 ppm sodium bicarbonate.

Test Methods

Adhesion

Adhesion testing is performed to assess whether the coating adheres to the coated substrate. The adhesion test was performed either according to ASTM D 3359 or DIN 53151. (i) ASTM D 3359—Test Method B, using SCOTCH 610 tape, available from 3M Company of Saint Paul, Minn. Adhesion is generally rated on a scale of 0-5 where a rating of "0" indicates no adhesion failure, a rating of "1" indicates 90% of the coating remains adhered, and a rating of "2" indicates 75% of the coating remains adhered, and so on. Adhesion ratings of 0 are typically desired for commercially viable coatings.

Flexibility

Wedge bends measure the flexibility of the coating and the ability to be formed. Wedge-bend test; a coated panel of 100 mm by 50 mm is bent over a 6 mm cylindrical mandrel. The folded panel thus produced is then impacted (4.5 Nm or 45 kg·cm) in a device (the wedge-bend tester) to form a wedge-shaped contour, flat at one end and 6 mm diameter at the other end. The panel is immersed for two minutes in an acidified copper sulphate solution. The flexibility is assessed by measuring the continuous damage caused by the impact.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-5 where a rating of "0" indicates no blush and a rating of "5" indicates complete whitening of the film. Blush ratings of at most 2 are typically desired for commercially viable coatings and optimally 1 or less. Blush si rated for both the steam area and the immersed liquid area of the panel.

Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. Testing is accomplished by subjecting the substrate to heat ranging from 105-130° C. and pressure ranging from 0.7 kg/cm 2 to 1.05 kg/cm 2 for a period of 15 minutes to 90 minutes. For the present evaluation, the coated substrate was immersed in deionized water and subjected to heat of 121 0 C (25O 0 F) and pressure of 1.05 kg/cm 2 for a period of 90 minutes. The coated substrate was then tested for adhesion and blush as described above. In food or beverage applications requiring retort performance, adhesion ratings of 0 and blush ratings of 2 or less are typically desired for commercially viable coatings.

Gatorade Retort Resistance for Beverage can Inside Spray Coatings

This is a measure of the coating integrity of the coated substrate after exposure to heat and pressure with a liquid such as Gatorade. For the present evaluation, the coated substrate was immersed in lemon-lime Gatorade and subjected to heat of 121° C. (25O° F.) and pressure of 1.05 kg/cm 2 for a period of 90 minutes. The coated substrate was then tested for adhesion and blush as described above. In food or beverage applications requiring retort performance, adhesion ratings of 0 and blush ratings of 2 or less are typically desired for commercially viable coatings.

Film Formulations

| | EXAMPLE | | | | | | | |
|---|---|---|---|---|---|---|---|---|
| | 8 grams | 9 grams | 10 grams | 11 grams | 12 grams | 13 grams | 13B grams | C14 grams |
| PMPD #1 | 62.5 | | | | | | | |
| PMPD #2 | | 62.5 | | | | | | |
| PMPD #3 | | | 62.5 | | | | | |
| PMPD#4 | | | | 55.6 | | | | |
| PMPD#5 | | | | | 55.6 | | | |
| PMPD #6A | | | | | | 55.6 | | |
| PMPD #6B | | | | | | | 55.6 | |
| PE #7 | | | | | | | | 55.6 |
| 50/50 DI/EB | 20 | 20 | 20 | 20 | 20 | 20 | 20 | 20 |
| BYK 310 | 0.05 | 0.05 | 0.05 | 0.05 | 0.05 | 0.05 | 0.05 | 0.05 |
| BYK 016 | 0.05 | 0.05 | 0.05 | 0.05 | 0.05 | 0.05 | 0.05 | 0.05 |

| | EXAMPLE | | | | | | | |
|---|---|---|---|---|---|---|---|---|
| | 15 grams | 16 grams | 17 grams | 18 grams | 19 grams | 20A grams | 20B grams | C21 grams |
| PMPD #1 | 57.8 | | | | | | | |
| PMPD #2 | | 57.8 | | | | | | |
| PMPD #3 | | | 57.8 | | | | | |
| PMPD#4 | | | | 51.4 | | | | |
| PMPD#5 | | | | | 51.4 | | | |
| PMPD #6A | | | | | | 51.4 | | |
| PPMD #6B | | | | | | | 51.4 | |
| PE #7 | | | | | | | | 51.4 |
| Bakelite PF6535 | 2.88 | 2.88 | 2.88 | 2.88 | 2.88 | 2.88 | 2.88 | 2.88 |
| 50/50 DI/EB | 20 | 20 | 20 | 20 | 20 | 20 | 20 | 20 |
| BYK 310 | 0.05 | 0.05 | 0.05 | 0.05 | 0.05 | 0.05 | 0.05 | 0.05 |
| BYK 016 | 0.05 | 0.05 | 0.05 | 0.05 | 0.05 | 0.05 | 0.05 | 0.05 |

BYK-310 is a heat resistant silicone additive for film production.
BYK-016 is polymeric defoamer.
DI/EB means deionized water and EB Test Results Alcoa Chrome Treated Aluminum

| COATING | 90' Gatorade Retort Adhesion | Steam/Liquid Blush |
|---|---|---|
| EXAMPLE 9 | 0 | 5/5 |
| EXAMPLE 11 | 0 | 5/5 |
| EXAMPLE 12 | 0 | 4/1 |
| EXAMPLE 13A | 0 | 1/1 |
| EXAMPLE 13B | 0 | 1/1 |
| COMPARATIVE EXAMPLE 14 | 5 | 5/5 |

Tin Free Steel

| COATING | Wedge Bends % fail | With crosslinker COATING | Wedge Bends % fail |
|---|---|---|---|
| EXAMPLE 8 | 75, 72 | EXAMPLE 15 | 34, 34 |
| EXAMPLE 9 | 33, 32 | EXAMPLE 16 | 15, 15 |
| EXAMPLE 10 | 79, 80 | EXAMPLE 17 | 29, 29 |
| EXAMPLE 11 | 19, 19 | EXAMPLE 18 | 25, 29 |
| EXAMPLE 12 | 6, 7 | EXAMPLE 19 | 65, 57 |
| EXAMPLE 13A | 2, 2 | EXAMPLE 20A | 32, 31 |
| EXAMPLE 13B | 8, 9 | EXAMPLE 20B | 35, 38 |
| COMPARATIVE EXAMPLE 14 | 77, 71 | COMPARATIVE EXAMPLE 21 | 87, 85 |

Electro Tinplate

| COATING | 90' DI RETORT Adhesion | Steam/Liquid Blush | 90' 400 ppm Sodium Bicarbonate RETORT Adhesion | Steam/Liquid Blush |
|---|---|---|---|---|
| EXAMPLE 8 | 0 | 3/3 | 0 | 5/5 |
| EXAMPLE 9 | 0 | 2/1 | 0 | 5/5 |
| EXAMPLE 10 | 0 | 2/3 | 0 | 5/5 |
| EXAMPLE 11 | 0 | 1/1 | 0 | 3/5 |
| EXAMPLE 12 | 0 | 1/0 | 0 | 0/2 |
| EXAMPLE 13A | 0 | 1/0 | 0 | 0/1 |
| EXAMPLE 13B | 0 | 1/0 | 0 | 0/1 |
| COMPARATIVE EXAMPLE 14 | 0 | 5/5 | 5 | 5/5 |
| EXAMPLE 15 | 0 | 0/1 | 0 | 1/1 |
| EXAMPLE 16 | 0 | 0/0 | 0 | 0/1 |
| EXAMPLE 17 | 0 | 0/0 | 0 | 0/2 |
| EXAMPLE 18 | 0 | 0/0 | 0 | 0/1 |
| EXAMPLE 19 | 0 | 0/0 | 0 | 0/1 |
| EXAMPLE 20A | 0 | 0/0 | 0 | 0/1 |
| EXAMPLE 20B | 0 | 0/0 | 0 | 0/1 |
| COMPARATIVE EXAMPLE 21 | 0 | 5/5 | 3 | 5/5 |

Additional Comparative Examples

The following Comparative Examples are prepared and tested substantially similar to Examples 1-21 unless otherwise noted.

Comparative Example 22

A. Synthesis of High Tg Polyester Resin 1. 1252.9 grams of 2-methyl, 1,3-propanediol (MP Dial), 54 grams of trimethylol propane (TMP), and 3.6 grams Fascat 9100 and 15.5 grams of Fascat 4202 catalysts were charged to a round bottom flask equipped with a packed column, partial condenser, receiver, and nitrogen blanket.

2. The flask was heated until the glycols were melted and 145.4 grams of adipic acid (AA) and 1993.3 grams of terephthalic acid (TPA) were added with mixing.

3. The temperature was steadily and gradually increased to 238 degrees centigrade and waters of esterification were removed.

4. When the acid value was 16.2, the temperature was reduced to 182 degrees centigrade.

5. 154.4 grams of trimellitic anhydride (TMA) and 256 grams of N-methyl pyrrolidone (NMP) were added. The temperature is maintained at 182 degrees centigrade until an acid value of 37 was reached.

6. The temperature was reduced to 70 degrees centigrade and the polymer was cut to 70% NV with methyl ethyl ketone (MEK).

The physical properties of the Solution from Step 6:

| Percent Solids | NVM | 70 |
|---|---|---|
| Acid Value | Mg KOH/g | 31.6 |
| Molecular Weight | Mn | 1952 |
| Molecular Weight | Mw | 8302 |
| Hydroxyl Number | Mg KOH/g | 33 |

B. Preparation of Polyester Dispersion (PE)

1. 1031.8 grams of the polyester solution at 70% NVM and 36.2 grams of Dimethylethanolamine (DMEOA) were charged to a round bottom flask equipped with a total condenser and receiver.

2. The flask was heated to 40 degrees centigrade with mixing.

3. Upon reaching temperature, 1261.9 grams of deionized water was added over approximately 30 minutes.

4. Vacuum was applied to the flask and slowly increased to a maximum of 26 inches of mercury.

5. Vacuum was continued until 48% NVM is reached and then deionized water is added for a final NVM of 45%.

The physical properties of the dispersion are:

| Percent Solids | NVM | 45 |
|---|---|---|
| pH | — | 7.9 |
| Particle Size | nm | 22.3 |

Comparative Example 23

A. Synthesis of High Tg Polyester Resin 1. 1245.2 grams of 2-methyl, 1,3-propanediol (MP Diol), 54 grams of trimethylol propane (TMP) and 3.6 grams Fascat 9100 catalyst were charged to a round bottom flask equipped with a packed column, partial condenser, receiver, and nitrogen blanket.

2. The flask was heated until the glycols were melted and 2157.6 grams of terephthalic acid (TPA) were added with mixing.

3. The temperature was steadily and gradually increased to 238 degrees centigrade and waters of esterification were removed.

4. When the acid value was 13.5, the temperature was reduced to 182 degrees centigrade.

5. 143.3 grams of trimellitic anhydride (TMA) and 259 grams of N-methyl pyrrolidone (NMP) were added. The temperature is maintained at 182 degrees centigrade until an acid value of 35.2 was reached.

6. The temperature was reduced to 70 degrees centigrade and the polymer was cut to 70% NV with methyl ethyl ketone (MEK).

The physical properties of the Solution from Step 6:

| Percent Solids | NVM | 70 |
|---|---|---|
| Acid Value | Mg KOH/g | 31.4 |
| Molecular Weight | Mn | 2228 |
| Molecular Weight | Mw | 8771 |
| Hydroxyl Number | Mg KOH/g | 33.8 |

B. Preparation of Polyester Dispersion (PE)

1. 1002.7 grams of the polyester solution at 70% NVM, 33.9 grams of Dimethylethanolamine (DMEOA) were charged to a round bottom flask equipped with a total condenser and receiver.
2. The flask was heated to 40 degrees centigrade with mixing.
3. Upon reaching temperature, 1188 grams of deionized water was added over approximately 30 minutes.
4. Vacuum was applied to the flask and slowly increased to a maximum of 26 inches of mercury.
5. Vacuum was continued until 48% NVM is reached and then deionized water is added for a final NVM of 45%.

The physical properties of the dispersion are:

| Percent Solids | NVM | 45 |
|---|---|---|
| pH | — | 7.8 |
| Particle Size | nm | 20.6 |

Comparative Example 24

A. Synthesis of High Tg Polyester Resin 1. 615.6 grams of 2-methyl, 1,3-propanediol (MP Diol), 684 grams of 1,4-cyclohexanedimethanol (CHDM-90), 216.2 grams of trimethylol propane (TMP) and 0.72 grams Fascat 9100 catalyst were charged to a round bottom flask equipped with a packed column, partial condenser, receiver, and nitrogen blanket.
2. The flask was heated until the glycols were melted and 496.1 grams of adipic acid (AA) and 1488.3 grams of isophthalic acid (IPtA) were added with mixing.
3. The temperature was steadily and gradually increased to 227 degrees centigrade and waters of esterification were removed.
4. When the acid value was 102, the temperature was reduced to 165 degrees centigrade.
5. 168 grams of trimellitic anhydride (TMA) and 259 grams of methyl amyl ketone (MAK) were added. The temperature was maintained at 165 degrees centigrade until an acid value of 39.9 was reached.
6. The temperature was reduced to 70 degrees centigrade and the polymer was cut to 77% NV with methyl ethyl ketone (MEK) and then to 70% NV with ethylene glycol monobutyl ether (EB).

The physical properties of the Solution from Step 6:

| Percent Solids | NVM | 71 |
|---|---|---|
| Acid Value | Mg KOH/g | 39.5 |
| Molecular Weight | Mn | 3512 |
| Molecular Weight | Mw | 66,800 |
| Hydroxyl Number | Mg KOH/g | 30.9 |

B. Preparation of Polyester Dispersion (PE)

1. 1042.8 grams of the polyester solution at 71% NVM and 46 grams of Dimethylethanolamine (DMEOA) were charged to a round bottom flask equipped with a total condenser and receiver.
2. The flask was heated to 40 degrees centigrade with mixing.
3. Upon reaching temperature, 1202.9 grams of deionized water was added over approximately 30 minutes.
4. Vacuum was applied to the flask and slowly increased to a maximum of 26 inches of mercury.
5. Vacuum was continued until 42.8% NVM is reached and then deionized water is added for a final NVM of 40%.

The physical properties of the dispersion are:

| Percent Solids | NVM | 40 |
|---|---|---|
| pH | — | 6.9 |
| Particle Size | nm | 16.5 |

Comparative Examples 25-30

Films were prepared using Alcoa Chrome treated aluminium and tin free steel only. Film weights were 2-4 mg/square inch. The aluminium panels received a 16 second dwell time in a 300 degrees centigrade oven to reach a Peak Metal Temperature (PMT) of 450° F. The TFS panels received a 10 minutes at 380° F. bake at metal temperature (17 minutes dwell in 380° F. oven). The aluminium panels were then tested for retort resistance—both 90 minutes in deionized water and 30 minutes in lemon-lime Gatorade. The TFS panels were tested for retort resistance for 90 minutes in deionized water only.

Film Formulation

| | COMPARATIVE EXAMPLE | | | | | |
|---|---|---|---|---|---|---|
| | 25 grams | 26 grams | 27 grams | 28 grams | 29 grams | 30 grams |
| POLYESTER #22 | 222.2 | 177.8 | | | | |
| POLYESTER #23 | | | 222.2 | 177.8 | | |
| POLYESTER #24 | | | | | 250 | 200 |
| CYMEL 1123 | | 20 | | 20 | | 20 |
| DI WATER | 40 | 40 | 40 | 40 | 40 | 40 |
| EB | 40 | 40 | 40 | 40 | 40 | 40 |
| NACURE 5925 | | 1 | | 1 | | 1 |
| BYK 310 | 0.2 | 0.2 | 0.2 | 0.2 | 0.2 | 0.2 |
| BYK 016 | 0.2 | 0.2 | 0.2 | 0.2 | 0.2 | 0.2 |

CYMEL 1123: An amino type resin crosslinker for coatings.
NACURE 5925: An amine blocked acid catalyst.

Test Results

Alcoa Chrome Treated Aluminum

| | 90' DI Water Retort | |
|---|---|---|
| COATING | Adhesion | Blush |
| EXAMPLE 25 | 0 | 1 |
| EXAMPLE 27 | 0 | 2 |
| EXAMPLE 29 | 0 | 1 |

Tin Free Steel

| COATING | 90' DI Water Retort Adhesion | Blush |
|---|---|---|
| EXAMPLE 25 | 0 | 2 |
| EXAMPLE 26 | 0 | 1 |
| EXAMPLE 27 | 0 | 3 |
| EXAMPLE 28 | 0 | 1 |
| EXAMPLE 29 | 0 | 3 |
| EXAMPLE 30 | 0 | 5 |

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Those skilled in the art will recognize, or be able to ascertain using no more than routine experimentation, many equivalents to the specific embodiments of the method and compositions described herein. Such equivalents are intended to be encompassed by the following claims.

We claim:

1. A phenolic modified polyester resin composition prepared by grafting a phenolic resin to a polyester resin, wherein the phenolic modified polyester resin is substantially free of bisphenol A, wherein the polyester resin is prepared by condensing one or more carboxylic acids with one or more polyalcohols, and wherein the phenolic resin is grafted to the carboxylic acid residues or the polyalcohol residues of the polyester resin.

2. The phenolic modified polyester resin according to claim 1, wherein the phenolic resin is a condensation product of at least one aromatic hydrocarbon and at least one of an aldehyde or a ketone.

3. The phenolic modified polyester resin according to claim 2, wherein the polyester resin has a molecular weight of between 6,000 and 100,000 g/mol.

4. The phenolic modified polyester resin according to claim 3, wherein the polyester resin has a molecular weight of between 7,000 and 35,000 g/mol.

5. The phenolic modified polyester resin according to claim 4, wherein the polyester resin has an Acid Number of between 25 and 55, a hydroxyl number between 30 and 60 and a Tg of between 30° C. and 55° C.

6. The phenolic modified polyester resin according to claim 2, wherein the phenolic resin is the condensation product of an aromatic hydrocarbon and one of an aldehyde and ketone.

7. The phenolic modified polyester resin according to claim 6, wherein the phenolic resin is present in amount from 6% to 30% per total weight of the combined resins, and the polyester resin is present in an amount from 70% to 94% per total weight.

8. The phenolic modified polyester resin according to claim 6, wherein the phenolic resin is selected from the group consisting of a novolak resin and a resol resin.

9. The phenolic modified polyester resin according to claim 1, wherein the one or more carboxylic acids comprise adipic acid, isophthalic acid and terephthalic acid, and the one or more polyalcohols comprise 2-methyl-1,3-propanediol and trimethylol propane.

10. The phenolic modified polyester resin according to claim 1, wherein the one or more carboxylic acids is selected from the group consisting of succinic acid, glutaric acid, dimethyl glutaric acid, adipic acid, dimethyl adipic acid, azelaic acid, phthalic acid, isophthalic acid, 5-tert-butyl isophthalic acid, terephthalic acid, dimethyl terephthalic acid, 2,6-naphthalene dicarboxylic acid, and mixtures thereof.

11. The phenolic modified polyester resin according to claim 1, wherein the one or more carboxylic acids is selected from the group consisting of adipic acid, isophthalic acid, terephthalic acid, and mixtures thereof.

12. A composition comprising:
A phenolic modified polyester resin composition prepared by grafting a phenolic resin to a polyester resin, wherein the phenolic modified polyester resin is dispersed in an aqueous medium and is substantially free of bisphenol A, wherein the polyester resin is prepared by condensing one or more carboxylic acids with one or more polyalcohols, and wherein the phenolic resin is grafted to the carboxylic acid residues or the polyalcohol residues of the polyester resin.

13. The composition according to claim 12, wherein the polyester resin comprises a condensation product of one or more carboxylic acids with one or more polyalcohols, and the phenolic resin is a condensation product of at least one aromatic hydrocarbon and at least one of an aldehyde or a ketone.

14. The composition according to claim 13, wherein the polyester resin has a molecular weight of between 7,000 and 35,000 g/mol.

15. The composition according to claim 14, wherein the polyester resin has an Acid Number of between 25 and 55, an hydroxyl number between 30 and 60 and a Tg of between 30° C. and 55° C.

16. The composition according to claim 12, wherein the phenolic resin is present in phenolic modified polyester resin in amount from 6% to 30% per total weight of the combined resins, and the polyester resin is present in an amount from 70% to 94% per total weight.

17. The composition according to claim 12, wherein the composition is between 30% and 50% NVM.

18. A phenolic modified polyester resin composition comprising a phenolic resin grafted to a polyester resin, wherein the phenolic modified polyester resin is substantially free of bisphenol A, wherein the polyester resin is prepared by condensing one or more carboxylic acids with one or more polyalcohols, and wherein the phenolic resin is grafted to the carboxylic acid residues or the polyalcohol residues of the polyester resin.

* * * * *